United States Patent
Wang et al.

(10) Patent No.: US 10,221,290 B2
(45) Date of Patent: Mar. 5, 2019

(54) PROCESS FOR PRODUCING A CURED RUBBER SHEET THAT IS FREE OF SURFACE PARTICULATE

(71) Applicant: FIRESTONE BUILDING PRODUCTS CO., LLC

(72) Inventors: Hao Wang, Carmel, IN (US); Donna M Tippmann, Fishers, IN (US); Steven C Bodie, Noblesville, IN (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 218 days.

(21) Appl. No.: 15/105,403

(22) PCT Filed: Dec. 18, 2014

(86) PCT No.: PCT/US2014/071171
§ 371 (c)(1),
(2) Date: Jun. 16, 2016

(87) PCT Pub. No.: WO2015/095528
PCT Pub. Date: Jun. 25, 2015

(65) Prior Publication Data
US 2016/0319090 A1    Nov. 3, 2016

Related U.S. Application Data

(60) Provisional application No. 61/918,348, filed on Dec. 19, 2013.

(51) Int. Cl.
*C08J 7/18* (2006.01)
*B32B 7/06* (2006.01)
(Continued)

(52) U.S. Cl.
CPC .............. *C08J 7/18* (2013.01); *B32B 7/06* (2013.01); *B32B 25/00* (2013.01); *B32B 25/16* (2013.01);
(Continued)

(58) Field of Classification Search
CPC ........ C08J 7/18; C09D 121/00; C09D 123/16; E04D 5/08; E04D 5/10; B32B 7/06;
(Continued)

(56) References Cited

U.S. PATENT DOCUMENTS 5,854,327 A * 12/1998 Davis .................. C08J 5/18
524/445
7,652,091 B2 * 1/2010 Inokuchi ............ C09D 175/16
524/474
(Continued)

FOREIGN PATENT DOCUMENTS

EP       1 090 948 A2   4/2001
WO       2013/142562 A2   9/2013

OTHER PUBLICATIONS

International Search Report for Appl. No. PCT/US2014/071171 dated May 8, 2015, p. 1-8.

*Primary Examiner* — Fred M Teskin
(74) *Attorney, Agent, or Firm* — Brian D. McAlhaney; Arthur M. Reginelli

(57) ABSTRACT

A method for making a cured rubber sheet, the method comprising providing an uncured rubber sheet, where the uncured rubber sheet includes opposing planar surfaces, applying a curable coating composition to one planar surface of the sheet to form a layer of curable coating composition, subjecting the curable coating composition to curing conditions that cure the coating composition and thereby form a cured coating layer on the uncured rubber sheet, rolling the uncured rubber sheet having a cured coating layer onto itself to form a roll, and subjecting the roll to curing conditions
(Continued)

that cure the uncured rubber sheet and thereby forms a roll of cured rubber sheet.

25 Claims, 2 Drawing Sheets

(51) Int. Cl.
   *B32B 25/00*   (2006.01)
   *C09D 121/00*   (2006.01)
   *C09D 123/16*   (2006.01)
   *B32B 25/16*   (2006.01)
   *C08J 7/04*   (2006.01)
   *E04D 5/08*   (2006.01)

(52) U.S. Cl.
   CPC ............ *C08J 7/047* (2013.01); *C09D 121/00* (2013.01); *C09D 123/16* (2013.01); *E04D 5/08* (2013.01); *C08J 2323/16* (2013.01); *C08J 2421/00* (2013.01); *C08J 2433/00* (2013.01)

(58) Field of Classification Search
   CPC ....... B32B 25/00; B32B 25/16; B32B 25/042; B32B 2419/06
   USPC .............. 156/71, 192; 427/177, 340; 428/77
   See application file for complete search history.

(56) References Cited

U.S. PATENT DOCUMENTS

| | | | |
|---|---|---|---|
| 8,367,760 B1* | 2/2013 | Wang | ...................... B32B 5/028 524/492 |
| 2006/0280892 A1* | 12/2006 | Davis | .................. B29C 37/0067 428/40.1 |
| 2009/0277126 A1 | 11/2009 | Wollert et al. | |
| 2010/0200148 A1 | 8/2010 | Douglas | |
| 2014/0179823 A1* | 6/2014 | Hejl | ........................ C09D 4/06 522/121 |

* cited by examiner

PROCESS FOR PRODUCING A CURED RUBBER SHEET THAT IS FREE OF SURFACE PARTICULATE

This application claims the benefit of U.S. Provisional Application Ser. No. 61/918,348, filed on Dec. 19, 2013, which is incorporated herein by reference.

FIELD OF THE INVENTION

Embodiments of the present invention are directed toward a process for producing a rubber sheet, such as an EPDM sheet, that is useful as a roofing membrane. The rubber sheet is fabricated by using a process that results in a particulate-free cured sheet.

BACKGROUND OF THE INVENTION

EPDM membranes, which are cured sheets of ethylene-propylene-diene terpolymer rubber, are often used in the construction industry to cover flat or low-sloped roofs. During manufacture of the EPDM membranes, uncured sheets, also referred to as green membranes, are rolled and placed into a curing oven to effect vulcanization of the rubber in the presence of a cure system. In order to prevent the roll of green membrane from sticking to itself ("blocking"), and ultimately curing to itself, the membrane is treated with a dusting agent or particulate prior to being rolled and cured. Industry standards include the use of talc and mica for dusting, although other materials have been used such as, for example, cellulosic materials. After curing of the membrane, the rolled, cured membrane is unrolled, typically within a stripping operation, and then fabricated into a roofing membrane. Fabrication may include, for example, cutting the membrane to size or applying an adhesive tape.

These membranes, which may also be referred to as panels, are typically delivered to a construction site in a bundled roll, transferred to the roof, and then unrolled and positioned. The sheets are then affixed to the building structure by employing varying techniques such as mechanical fastening, ballasting, and/or adhesively adhering the membrane to the roof. The roof substrate to which the membrane is secured may be one of a variety of materials depending on the installation site and structural concerns. For example, the surface may be a concrete, metal, or wood deck, it may include insulation or recover board, and/or it may include an existing membrane.

In addition to securing the membrane to the roof—which mode of attachment primarily seeks to prevent wind uplift—the individual membrane panels, together with flashing and other accessories, are positioned and adjoined to achieve a waterproof barrier on the roof. Typically, the edges of adjoining panels are overlapped, and these overlapping portions are adjoined to one another through a number of methods depending upon the membrane materials and exterior conditions. The overlapped portions are often referred to as lap regions. One approach to seaming the membranes involves providing adhesives or adhesive tapes between the overlapping portions, thereby creating a water resistant seal.

Where adhesives are employed to seam the membranes to each other (i.e., create a lap seam) and/or adhere the membrane to the roof surface, the presence of the dusting agent, which may also be referred to as particulate, can be problematic since the dusting agent can interfere with proper adhesion between the membrane and the adhesive. As a result, steps must be taken to remove the dusting agent in the location where the adhesive is applied. For example, known techniques for lap seam preparation include the use of a primer solution in conjunction with a scrubbing apparatus that can lift the dusting agent away from the membrane by, for example, employing scrubbing techniques. Similar issues exist where there is a desire to create a fully-adhered roofing system wherein adhesive is used to secure substantially one surface of a membrane panel to the roof deck. Typically, where there is a desire to create a fully-adhered roofing system, thick layers of adhesive, or multiple layers of adhesive, including those adhesives that are dissolved in organic solvents, are used to adhere the membranes that carry the dusting agent. Still further, the presence of the dusting agent can frustrate further fabrication or modification of the membranes. For example, where there is a desire to adhere a fabric backing to the EPDM sheet, such as a fleece backing, the presence of the dusting agent can frustrate the adherence of the fabric to the membrane. Also, where there is a desire to prepare an EPDM membrane carrying a factory-applied adhesive layer (e.g., a peel-and-stick membrane), the presence of the dusting agent can interfere with proper application and adhesion of the pressure-sensitive adhesive to the membrane surface.

SUMMARY OF THE INVENTION

One or more embodiments of the present invention provide a method for making a cured rubber sheet, the method comprising providing an uncured rubber sheet, where the uncured rubber sheet includes opposing planar surfaces, applying a curable coating composition to one planar surface of the sheet to form a layer of curable coating composition, subjecting the curable coating composition to curing conditions that cure the coating composition and thereby form a cured coating layer on the uncured rubber sheet, rolling the uncured rubber sheet having a cured coating layer onto itself to form a roll, and subjecting the roll to curing conditions that cure the uncured rubber sheet and thereby forms a roll of cured rubber sheet.

One or more embodiments of the present invention further provide a cured rubber membrane sheet comprising a planar body having first and second planar surfaces, said planar body including cured rubber and a cured coating layer disposed on said first planar surface.

DETAILED DESCRIPTION OF ILLUSTRATIVE EMBODIMENTS

Embodiments of the present invention are based, at least in part, on the discovery of a process for producing a cured rubber sheet (e.g., a cured EPDM sheet) that is substantially free of particulate. The process includes providing an uncured rubber sheet, applying a curable coating composition to one planar surface of the sheet, curing the curable coating composition, and then curing the uncured rubber sheet while the sheet is rolled on itself. It has unexpectedly been discovered that the step of curing the rubber sheet does not further crosslink or adhere the cured coating layer to the EPDM sheet, at least not to a technologically unuseful degree. It is believed that this results from fully or substantially curing the coating composition prior to curing the rubber sheet. The cured coating layer therefore serves as a barrier that allows the rolled rubber sheet to be unwound after curing. The cured rubber sheets (e.g., EPDM sheets) may advantageously be used as roofing membranes that can be secured to a roof deck and/or seamed without the need to address particulate that can interfere with the adhesives. Additionally, because these rubber sheets are substantially free of surface particulate, these rubber sheets can advantageously be modified by, for example, application of a fabric backing or pressure-sensitive adhesive, without taking additional steps or added measures to account for surface particulate. Accordingly, fleece-backed EPDM sheet or peel-and-stick EPDM sheet, which carries a layer of pressure-sensitive adhesive, can be prepared using technologically efficient manufacturing techniques.

Figure 1:
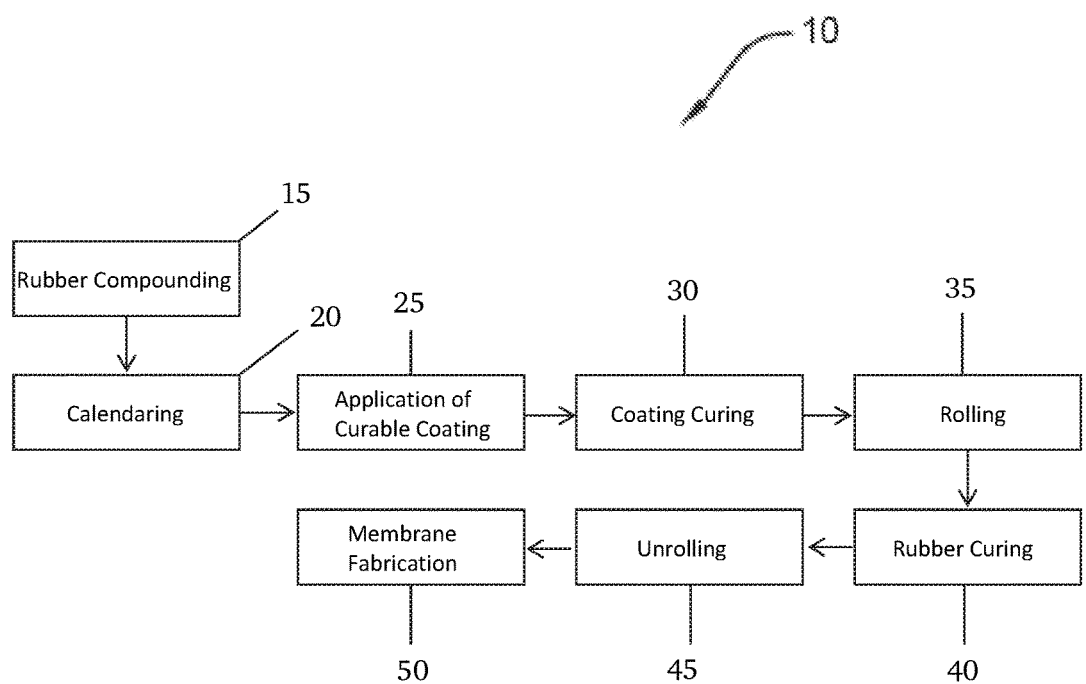
FIG. 1 is a flow chart showing steps involved in the process of one or more embodiments of the invention.

The process of the present invention can be described with reference to FIG. 1. In one or more embodiments, the manufacturing process 10 can include a rubber compounding step 15, which generally prepares a vulcanizable rubber composition that is capable of being calendared in calendaring step 20. Through the calendaring process or step, an uncured rubber sheet is produced. This uncured rubber sheet, which can also be referred to as a green sheet, can be provided to the coating step 25, wherein a layer of curable coating composition is applied to one planar surface of the uncured rubber sheet. Following application of the curable coating composition, which forms a layer of curable coating composition on the uncured sheet, the curable coating composition is subjected to curing conditions within a curing step 30. Following the step of curing the curable coating composition, which forms a cured coating layer on the uncured rubber sheet, the membrane is rolled onto itself, which may also be referred to as winding, within rolling or winding step 35. This step produces a roll of uncured rubber sheet having disposed on one planar surface thereof a layer of cured coating. This roll is then subjected to curing conditions within curing step 40, which serves to cure the uncured rubber sheet. As a result of curing step 40, a roll of cured rubber sheet is produced, wherein the cured rubber sheet has disposed on one planar surface thereof a cured coating layer. The roll of cured rubber sheet is then unwound, which may also be referred to as unrolled within unrolling or unwinding step 45. Once unrolled, the cured rubber sheet can be fabricated into a roofing membrane within fabrication step 50.

Preparation of Vulcanizable Composition

In one or more embodiments, the membranes produced by the present invention include cured rubber, one or more fillers, and an extender. Additionally, these membranes, which may be black or non-black, may include other constituents that are employed in rubber membranes or rubber compounds. For example, the membranes may include oil, wax, antioxidant, antiozonant, flame retardant, and the like. The cured membranes are a cured network deriving from a vulcanizable rubber composition and optionally the residue or reaction product of the cure system. The various other ingredients may be dispersed throughout the cured network. The membrane may further comprise fabric reinforcement.

In one or more embodiments, the cured rubber derives from a crosslinkable rubber. In one or more embodiments, the cured rubber derives from an olefinic rubber such as an olefinic terpolymer. In one or more embodiments, the olefinic terpolymer includes mer units that derive from ethylene, α-olefin, and optionally diene monomer. Useful α-olefins include propylene. In one or more embodiments, the diene monomer may include dicyclopentadiene, alkyl-dicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene, and mixtures thereof. Olefinic terpolymers and methods for their manufacture are known as disclosed at U.S. Pat. No. 3,280,082 as well as U.S. Publ. Appl. No. 2006/0280892, both of which are incorporated herein by reference. Furthermore, olefinic terpolymers and methods for their manufacture are known as disclosed in U.S. Pat. No. 8,367,760 U.S. Publication No. 2012-0045953, and co-pending U.S. application Ser. No. 12/982,198, which are also incorporated herein by reference. For purposes of this specification, elastomeric terpolymers may simply be referred to as EPDM.

In one or more embodiments, the elastomeric terpolymer may include at least 62 weight percent, and in other embodiments at least 64 weight percent mer units deriving from ethylene; in these or other embodiments, the elastomeric terpolymer may include at most 70 weight percent, and in other embodiments at most 69 weight percent, mer units deriving from ethylene. In one or more embodiments, the elastomeric terpolymer may include at least 2 weight percent, in other embodiments at least 2.4 weight percent, mer units deriving from diene monomer; in these or other embodiments, the elastomeric terpolymer may include at most 4 weight percent, and in other embodiments at most 3.2 weight percent, mer units deriving from diene monomer. In one or more embodiments, the balance of the mer units derive from propylene or other α-olefins. In one or more embodiments, low Mooney EPDM terpolymers are blended with high Mooney EPDM terpolymers to reduce the overall viscosity of the membrane compound and thereby accommodate processing.

As is known in the art, the rubber may be cured with a curative or cure system. The rubber can be cured by using numerous techniques such as those that employ sulfur cure systems, peroxide cure systems, and quinine-type cure systems. In certain embodiments, the sulfur cure systems may be employed in combination with vulcanizing accelerators. Suitable vulcanizing accelerators are disclosed in U.S. App. Publ. No. 2006/0280892, which is incorporated herein by reference. Examples of organic polysulfides are disclosed in U.S. Pat. No. 2,619,481, which is incorporated herein by reference.

Sulfur and sulfur-containing cure systems may be used, and may also be used with an accelerator. Suitable amounts of sulfur can be readily determined by those skilled in the art. In one or more embodiments from about 0.25 to 3.0 parts by weight (pbw) sulfur per 100 parts by weight rubber (phr) may be used, in other embodiments from about 0.30 to 2.8 pbw sulfur phr, and in other embodiments from about 0.35 to 2.5 pbw sulfur phr. The amount of accelerator can also be readily determined by those skilled in the art. In one or more embodiments, from about 1.5 to about 10 pbw accelerator phr may be used, in other embodiments from about 2.0 to about 9 pbw accelerator phr may be used, in other embodiments from about 2.5 to about 8 pbw accelerator phr may be used, and in yet other embodiments from about 3.0 to about 7 pbw accelerator phr may be used.

As mentioned above, the membranes of the present invention include filler. These fillers may include those conventionally employed in the art, as well as combinations of two or more of these fillers. In one or more embodiments, the filler may include carbon black. Examples of useful carbon blacks include those generally characterized by average industry-wide target values established in ASTM D-1765. Exemplary carbon blacks include GPF (General-Purpose Furnace), FEF (Fast Extrusion Furnace), and SRF (Semi-Reinforcing Furnace). One particular example of a carbon black is N650 GPF Black, which is a petroleum-derived reinforcing carbon black having an average particle size of about 60 nm and a specific gravity of about 1.8 g/cc. Another example is N330, which is a high abrasion furnace black having an average particle size about 30 nm, a maximum ash content of about 0.75%, and a specific gravity of about 1.8 g/cc.

Other useful fillers include clay and talc, such as those disclosed in U.S. Publ. Appl. No. 2006/0280892, which is incorporated herein by reference. Still other useful fillers include silica, which may be used in conjunction with a coupling agent. U.S. Pat. No. 8,367,760 discloses useful fillers including silica, and is incorporated herein by reference.

As mentioned above, the membranes of the present invention may include extenders. Useful extenders include paraffinic, naphthenic oils, and mixtures thereof. These oils may be halogenated as disclosed in U.S. Pat. No. 6,632,509, which is incorporated herein by reference. In one or more embodiments, useful oils are generally characterized by low surface content, low aromaticity, low volatility and a flash point of more than about 550° F. Useful extenders are commercially available. One particular extender is a paraffinic oil available under the tradename SUNPAR™ 2280 (Sun Oil Company). Another useful paraffinic process oil is HYPRENE P150BS (Ergon Oil Inc. of Jackson, Miss.).

In addition to the foregoing constituents, the membranes of this invention may also optionally include mica, coal filler, ground rubber, titanium dioxide, calcium carbonate, silica, homogenizing agents, phenolic resins, flame retardants, zinc oxide, stearic acid, and mixtures thereof as disclosed in U.S. Publ. Appl. No. 2006/0280892. Certain embodiments may be substantially devoid of any of these constituents.

In one or more embodiments, the rubber membranes produced by the process of this invention may include from about 20 to about 50, in other embodiments from about 24 to about 36, and in other embodiments from about 28 to about 32% by weight Rubber (e.g., EPDM) based on the entire weight of the mixture.

In one or more embodiments, the rubber membranes produced by the process of this invention may include from about 70 to about 100 pbw, in other embodiments from about 75 to about 95 pbw, and in other embodiments from about 77 to about 85 parts by weight carbon black phr. Certain embodiments may be substantially devoid of carbon black.

In one or more embodiments, the rubber membranes produced by the process of this invention may include from about 55 to about 95 pbw, in other embodiments from about 60 to about 85 pbw, and in other embodiments from about 65 to about 80 pbw extender per 100 pbw phr.

Calendaring

In one or more embodiments, the step of calendaring the vulcanizable composition to form an uncured rubber sheet may employ conventional calendaring techniques. As is generally known in the art, the step of calendaring produces an uncured rubber sheet having a thickness generally similar to the thickness of the desired product (i.e., the cured rubber sheet).

In one or more embodiments, the thickness of the uncured rubber sheet may be at least 15 mil (0.381 mm), in other embodiments at least 40 mil (1.016 mm), and in other embodiments at least 60 mil (1.524 mm). In these or other embodiments, the thickness of the uncured rubber sheet may be at most 120 mil (3.048 mm), in other embodiments at most 100 mil (2.54 mm), and in other embodiments at most 80 mil (2.032 mm). In one or more embodiments, the thickness of the uncured rubber sheet may be from about 30 mil (0.762 mm) to about 120 mil (3.048 mm), in other embodiments from about 40 mil (1.016 mm) to about 100 mil (2.54 mm), and in other embodiments from about 45 mil (1.143 mm) to about 90 mil (2.286 mm).

Application of Curable Coating

The uncured rubber sheet, which includes first and second opposing planar surfaces, then receives a coating of the curable coating composition on one of its planar surfaces. Application of the curable coating composition to one planar surface of the uncured sheet forms a curable coating layer, which may also be referred to as a layer of curable coating composition on the planar surface of the uncured sheet.

In one or more embodiments, the thickness of the curable coating layer disposed on one planar surface of the uncured sheet may be at least 0.1 μm, in other embodiments at least 0.3 μm, and in other embodiments at least 0.5 μm. In these or other embodiments, the thickness of the curable coating layer may be at most 10 μm, in other embodiments at most 7 μm, and in other embodiments at most 5 μm. In one or more embodiments, the thickness of the curable coating layer may be from about 0.1 to about 10 μm, in other embodiments from about 0.3 to about 7 μm, and in other embodiments from about 0.5 to about 5 μm.

The curable coating composition may be applied to one planar surface of the uncured sheet using a variety of techniques. In one or more embodiments, the curable coating composition is applied to a planar surface of the uncured sheet using spraying techniques. In other embodiments, the curable coating composition is disposed on the planar surface of an uncured sheet using knife-coating techniques. In other embodiments, a curtain coater may be employed.

In one or more embodiments, the curable coating composition is applied over substantially the entire planar surface of the uncured sheet. In these or other embodiments, the uncured coating layer formed by application of the coating composition to the uncured sheet is continuous. In one or more embodiments, the curable coating layer covers at least 80%, in other embodiments at least 85%, in other embodiments at least 90%, and in other embodiments at least 99% of the surface area of one planar surface of the uncured sheet.

In particular embodiments, the curable coating composition is not applied to specific areas of the planar surface of the uncured sheet. For example, the planar surface of the uncured sheet may include a region generally known as the lap region, which is the area wherein the final product will overlap with adjoining sheets in a roof construction. These lap regions generally extend along the length of the membrane adjacent to the lateral edge of the membrane; i.e., the edge running along the length of the membrane. In one or more embodiments, the membrane may include one lap edge, and in other embodiments the membrane may include two lap edges, one on each opposing lateral side of the membrane.

In one or more embodiments, the step of applying the curable coating composition to one planar surface of the membrane excludes application of the curable coating composition to one or more lap regions. In these or other embodiments, the layer of curable coating composition may nonetheless be continuous between the lap regions.

Curable Coating

In one or more embodiments, the curable coating composition is a composition that is curable by electromagnetic radiation. In these or other embodiments, the composition is curable without the addition of a curing or crosslinking agent; i.e., the composition is curable in the absence of a curing compound that incorporates itself into the cured matrix. The curable coating composition may nonetheless include one or more cure promoters. In particular embodiments, the curable coating composition is curable by UV light.

In one or more embodiments, the curable coating composition includes monomer and/or oligomer that are cross-linked and/or further polymerized upon exposure to electromagnetic radiation (e.g., UV light).

In one more embodiments, the curable coating composition yields, upon curing, a cured polymeric network that includes polar groups. These polar groups may include, for example, ester functionalities, carboxylic acid functionalities, urethane functionalities, or alkoxysilane functionalities. As a result, the cured coating exhibits polar characteristics, which may advantageously inhibit adhesion to non-polar surfaces, such as the planar surface of a rubber sheet.

In one or more embodiments, the curable coating composition yields, upon curing, a cured polymeric composition or coating layer that exhibits flexibility; i.e., the cured coating layer can undergo flex stresses, such as those that would be experienced during the rolling of a membrane, without cracking. In these or other embodiments, the curable coating composition yields cured coatings that are elastic; i.e., the cured coating composition can be stretched to a 200% elongation without rupture.

In one or more embodiments, the cured coating composition includes acrylate oligomer and/or monomer. In these or other embodiments, the coating composition may further include a cure promoter that, upon exposure to electromagnetic radiation, such as UV light, can promote the polymerization and/or crosslinking of the acrylate monomer and oligomer.

In one or more embodiments, the curable coating composition is a 100% solids composition (i.e., the composition is devoid or substantially devoid of solvent). In these or other embodiments, the curable coating composition is a liquid composition that is devoid or substantially devoid of solvent.

In other embodiments, the curable coating composition is a one-part, moisture curable urethane coating composition. In one or more embodiments, these urethane coating compositions include isocyanate monomer and/or isocyanate oligomers that are curable upon exposure to moisture.

In one or more embodiments, the curable coating composition includes a UV-curable silicone coating. In other embodiments, the curable coating composition is a UV-curable acrylic or acrylate coating. In these or other embodiments, the curable coating composition is a UV-curable polyurethane composition.

In one or more embodiments, the curable coating composition may include a cure promoter. Suitable ionizing crosslinking promoters that can be used include: liquid high-vinyl 1,2-polybutadiene resins containing 90 percent 1,2-vinyl content; Sartomer SR-206 (ethylene glycol dimethacrylate), Di-Cup R(dicumyl peroxide, about 98 percent active), and Pental A (pentaerythritol resin prepared from tall oil). These chemical additives are preferably compatible with the other ingredients in the composition, they may also function to reduce the dosage of ionizing radiation needed to obtain the desired level of crosslinking.

Curing Curable Coating

Once a coating layer is formed on the uncured sheet, the coating layer is cured. This may be accomplished by subjecting the coating composition to energy that causes the coating composition to cure. As suggested above, curing of the coating composition may include polymerization of monomer or oligomer within the coating composition. In these or other embodiments, curing of the coating composition may include crosslinking of the coating composition. In one or more embodiments, the coating composition is cured upon the formation of a three dimensional polymeric network. In these or other embodiments, curing of the coating composition is indicated by an appreciable change in the solubility of the coating composition; in other words, while the coating composition may be soluble within particular solvents in its uncured state, the cured coating composition is substantially insoluble within the same solvent.

In one or more embodiments, the step of curing the curable coating composition may form chemical bonds between the coating composition and the uncured rubber sheet.

The step of applying energy to the coating composition may be accomplished using a variety of techniques. For example, the curable coating composition can be subjected to electromagnetic radiation such as UV radiation or IR radiation.

In one or more embodiments, the step of curing substantially cures the curable coating, which refers to the fact that further curing of the curable coating after the step of curing will not be appreciable within the context of this invention. For example, further curing of the curable coating will not have a deleterious impact on the subsequent steps of the process. In one or more embodiments, the step of curing the curable coating cures the curable coating to at least 70%, in other embodiments at least 80%, in other embodiments at least 90%, in other embodiments at least 95%, and in other embodiments at least 99% of its curing potential. Stated another, if subjected to further curing conditions, such as additional forms or degrees of energy, the curable coating composition will further cure by at most 30%, in other embodiments at most 20%, in other embodiments by at most 10%, in other embodiments by at most 5%, and in other embodiments by at most 1%.

In one or more embodiments, the step of curing produces a cured coating that is generally characterized by very little tack. In these or other embodiments, the cured coating likewise provides relatively low adhesion, especially to uncured rubber (e.g. EPDM). Likewise the cured coating of these or other embodiments does not form a strong bond to uncured rubber after being mated to uncured rubber while the rubber undergoes curing. In one or more embodiments, where the cured coating is mated to green EPDM, and the green EPDM is subjected to curing conditions while mated to the cured coating, the bond between the cured coating and the cured EPDM is characterized by a peel adhesion (ASTM D412) of less than 8, in other embodiments less than 5, in other embodiments less than 3, in other embodiments less than 2, and in other embodiments less than 1 lbf/in.

Rolling and Curing

In one or more embodiments, once the curable coating composition has been subjected to curing conditions to thereby form a cured coating on the uncured rubber sheet, the rubber sheet is then subjected to curing conditions that will cure the uncured rubber. In one or more embodiments, these curing conditions include subjecting the membrane to elevated temperatures. For example, the uncured rubber sheet, which carries the cured coating layer, may be subjected to temperatures in excess of 120° C., in other embodiments in excess of 130° C., and in other embodiments in excess of 150° C. In these or other embodiments, the membranes may be subjected to temperatures of from about 120° C. to about 200° C., in other embodiments from about 130° C. to about 180° C., and in other embodiments from about 140° C. to about 160° C. In these or other embodiments, the membranes may also be subjected to elevated pressures.

In one or more embodiments, curing may take place within an oven. In these or other embodiments, curing may take place within a rubber curing autoclave.

In one or more embodiments, prior to curing, the uncured rubber sheet, which carries the uncured coating layer, is wound into a roll for convenient placement into the curing apparatus. As the skilled person will appreciate, as the uncured membrane, which carries the cured coating layer, is wound upon itself, the cured coating layer will contact the planar surface of the uncured rubber sheet that is opposite to the planar surface upon which the coating composition was deposited.

In one or more embodiments, the uncured rubber sheet, particularly in the form of a roll, is subjected to curing conditions (e.g., elevated temperatures) for at least 1 hour, in other embodiments at least 3 hours, and in other embodiments at least 6 hours. In these or other embodiments, the uncured rubber sheet, particularly in the form of a roll, is subjected to cuing conditions for about 1 to about 24 hours, in other embodiments for about 3 to about 20 hours, and in other embodiments for about 6 to about 18 hours.

Unwinding and Fabrication

In one or more embodiments, the step of subjecting the uncured rubber sheet to curing conditions produces a cured rubber sheet carrying the cured coating layer. Where the uncured rubber sheet is wound into a roll prior to curing, the cured rubber sheet is then unwound following the curing step. The step of unwinding the cured rubber sheet can take place by using conventional techniques. For example, those skilled in the art are familiar with a stripping operation whereby the cured rubber sheet is unwound using an apparatus that can supply sufficient pulling force to unwind the membrane. Following the unwinding of the membrane, the membrane can be subjected to subsequent fabrication steps.

In one or more embodiments, the cured membrane, when in the form of a roll wherein the cured coating composition contacts the opposite planar surface of the membrane to which the coating was originally disposed, is characterized by technologically useful adhesion (or lack thereof) between the cured coating composition and the opposite planar surface of the membrane. In other words, any adhesion that exists between the surface of the cured coating and the opposite planar surface that the cured coating contacts when in the form of a roll is sufficiently weak to allow the rolled membrane to be efficiently unrolled. The level of adhesion that may exist between the top surface of the cured coating layer and the opposite planar surface of the cured membrane, which two surfaces contact each other when in the form of a roll, may be quantitatively defined based upon the pull force required to pull apart a similar assembly. For example, a test specimen may be prepared by applying a curable coating composition to a sample of uncured rubber sheet. The coating composition is then subsequently cured. A second uncured rubber sheet is then applied to the cured coating composition to form a sandwich wherein the cured coating composition is disposed between two uncured rubber sheets, and the sandwich sample is then subjected to curing conditions to cure the rubber such as 320° F. for 45 minutes under sufficient pressure to remove any entrapped air. Following the curing step, the respective cured rubber sheets are placed within opposing grips of an Instron and pulled apart. The pull force is accordingly measured. In one or more embodiments, the pull force required to pull the second cured rubber sheet from the surface of the cured coating is less than 15 lbf/linear inch, in other embodiments less than 10 lbf/linear inch, in other embodiments less than 5 lbf/linear inch, in other embodiments less than 2 lbf/linear inch, and in other embodiments less than 1 lbf/linear inch.

Following the step of curing and optionally unwinding the membrane, the cured membrane may be subjected to one or more additional processing steps prior to storage and/or shipping. In one or more embodiments, the cured membrane may be cut to length to form roofing membranes for installation at a roofing installation site. In the same or other embodiments, the cut membranes may be rolled for storage and shipping. In certain embodiments, the cured membrane may be spliced with other cured membranes to form a larger membrane.

In one or more embodiments, a thin film such as, for example, a primer and/or adhesive, may be applied to one or more surfaces and/or longitudinal edges of the cured membrane prior to the steps of cutting and/or rolling. For example, in certain embodiments, a thin film of adhesive may be applied to substantially all of one surface of the membrane for a fully adhered roofing system, as will be understood by those skilled in the art. In other embodiments, a thin film of primer and/or adhesive may applied in a narrow strip along one or more longitudinal edges of the membrane to facilitate the creation of lap seams. A release liner may optionally be positioned over the primer or adhesive layer.

Characteristics of Final Product

In one or more embodiments, the cured membrane created by the practice of the present invention includes a cured sheet of ethylene-propylene-diene copolymer rubber (EPDM). Dispersed within the crosslinked network of ethylene-propylene-diene copolymer may be various additives including, but not limited to, filler, oil, wax, antioxidant, antiozonant, flame retardant, and the like. In one or more embodiments, the cured membrane may be a single-ply sheet or a multi-ply sheet. In certain embodiments, the cured membrane may be devoid of fabric reinforcement or it may include a fabric reinforcement positioned between two or more plies. In one or more embodiments, the cured membrane may conform to the standards set forth in ASTM-D4637 (Standard Specification for EPDM Sheet Used In Single-Ply Roof Membrane).

Figure 2:
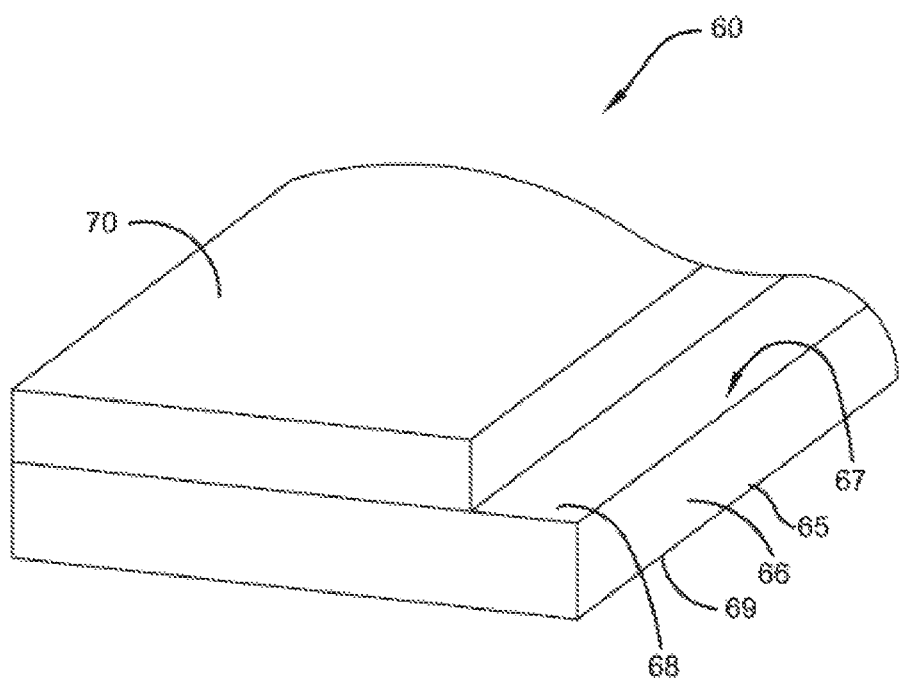
FIG. 2 is a perspective view of a cured rubber membrane prepared according to one or more embodiments of the present invention.

A cured rubber sheet prepared according to the process of the present invention can be described with reference to FIG. 2. Sheet 60, which may also be referred to as composite sheet 60, includes a planar body 65 including cured rubber. Planar body 65 includes first planar surface 67 and second planar surface 69. Disposed on first planar surface 67 is cured coating layer 70. In one or more embodiments, planar body 65 includes a lap region 68 within a portion of first planar surface 67. Lap region 68 can extend laterally along first edge 66 of body 65. In one or more embodiments, cured coating layer 70 is not disposed on lap region 68. In these or other embodiments, a lap region that is substantially free of cured coating layer 70 may also exist on the opposite latter edge of body 65.

In one or more embodiments, the width of the lap region (e.g., lap region 68) may be from about 2 to about 30 cm, in other embodiments from about 3 to about 20 cm, and in other embodiments from about 4 to about 15 cm.

As described above, the rubber membrane produced according to the process of this invention is substantially free of surface particulate. Substantially free of surface particulate refers to an amount of particulate on the surface of the membrane that is less than an amount that would have an appreciable impact on the subsequent fabrication, modification, or use of the membrane. In one or more embodiments, the rubber membranes of the present invention include less than 20 g/m$^2$, in other embodiments less than 10 g/m$^2$, in other embodiments less than 5 g/m$^2$, in other embodiments less than 1 g/m$^2$, in other embodiments less than 0.1 g/m$^2$ of surface particulate. In one or more embodiments, surface particulate refers to inorganic dusting agents such as talc or mica. In other embodiments, the surface particulate refers to organic materials, such as cellulose.

INDUSTRIAL APPLICABILITY

The cured rubber sheet prepared according to the present invention can be used as a roofing membrane to cover flat or low-sloped roofs. The membranes can be attached to the roof surface by using various techniques. In one embodiment, ballast is used. In another embodiment, the membrane is mechanically attached to the roof surface. In another embodiment, a fully-adhered roofing system can be created by the use of a bond adhesive applied during installation. In yet other embodiments, the membrane can carry a fabric backing, such as a fleece backing, and the membrane can be adhered to the roof surface using various adhesives that bind to the fabric backing. In yet other embodiments, the membrane can be fabricated to include a factory-applied adhesive layer, which is a pressure-sensitive adhesive. This membrane assembly typically includes a release paper that is removed at the time of installation and the membrane is adhered, through the pressure-sensitive adhesive, to the roof surface.

Various modifications and alterations that do not depart from the scope and spirit of this invention will become apparent to those skilled in the art. This invention is not to be duly limited to the illustrative embodiments set forth herein.

What is claimed is:

1. A method for making a cured rubber sheet, the method comprising:
   i. providing an uncured rubber sheet, where the uncured rubber sheet includes opposing planar surfaces;
   ii. applying a curable coating composition to one planar surface of the sheet to form a layer of curable coating composition;
   iii. subjecting the curable coating composition to curing conditions that cure the coating composition and thereby form a cured coating layer on the uncured rubber sheet;
   iv. rolling the uncured rubber sheet having a cured coating layer onto itself to form a roll; and
   v. subjecting the roll to curing conditions that cure the uncured rubber sheet and thereby forms a roll of cured rubber sheet;
   where the method is devoid of a step of applying a particulate to a planar surface of the sheet prior to said step of subjecting the roll to curing conditions that cures the uncured rubber sheet.

2. The method of claim 1, where the uncured rubber is uncured EPDM, and said method produces a cured EPDM sheet.

3. The method of claim 1, further comprising the step of unrolling the roll of cured rubber sheet after said step of subjecting the roll to curing conditions.

4. The method of claim 1, where said step of providing an uncured rubber sheet includes calendering an uncured EPDM composition into a sheet.

5. The method of claim 1, where the uncured rubber sheet has a thickness of from about 30 mil to about 120 mil, and where said step of applying includes forming a curable coating layer having a thickness of from about 0.1 µm to about 10 µm.

6. The method of claim 1, where the curable coating composition is curable by electromagnetic radiation.

7. The method of claim 1, where said cured rubber sheet includes less than 20 g/m$^2$ of surface particulate.

8. The method of claim 1, where the curable coating composition is curable by UV light.

9. The method of claim 8, where the curable coating composition includes UV-curable monomer, or UV-curable oligomer.

10. The method of claim 9, where the UV-curable monomer or UV-curable oligomer includes at least 1 acrylate functionality.

11. The method of claim 1, where the curable coating composition includes a cure promoter.

12. The method of claim 1, where said step of subjecting the curable coating to curing conditions includes subjecting the curable coating to electromagnetic radiation.

13. The method of claim 12, where the electromagnetic radiation is UV light.

14. The method of claim 1, where said step of subjecting the curable coating composition to curing conditions substantially cures the coating composition.

15. The method of claim 1, where said step of subjecting the curable coating composition to curing conditions fully cures the coating composition.

16. The method of claim 1, where said step of subjecting the roll to curing conditions includes subjecting the roll to a temperature of at least 130° C.

17. The method of claim 1, where said step of subjecting the roll to curing conditions includes placing the roll into an autoclave.

18. The method of claim 3, where said step of unrolling the roll includes stripping.

19. A cured rubber membrane sheet comprising:
   i. a planar body having first and second planar surfaces, said planar body including cured rubber; and
   ii. a cured coating layer disposed on said first planar surface, where said first and second planar surfaces and said cured coating layer are substantially free of surface particulate, where said first planar surface includes a first lap-edge region, and where said first lap-edge region is substantially free of said cured coating.

20. The membrane of claim 19, where the cured rubber includes cured EPDM.

21. The membrane of claim 19, where the planar body has a thickness of from about 30 to about 120 mil.

22. The membrane of claim 19, where said cured coating has a thickness of from about 0.1 µm to about 10 µm.

23. The membrane of claim 19, where said cured coating is a release coating.

24. The membrane of claim 19, where said rubber membrane includes less than 20 g/m$^2$ of surface particulate.

25. The membrane of claim 19, where said rubber membrane includes less than 0.1 g/m$^2$ of surface particulate.

* * * * *